United States Patent [19]

Ha

[11] Patent Number: 5,547,219
[45] Date of Patent: Aug. 20, 1996

[54] CRASH NET SAFETY DEVICE FOR AN AUTOMOBILE

[76] Inventor: Jin S. Ha, 17578 Tuscan Dr., Granada Hills, Calif. 91394

[21] Appl. No.: 320,406

[22] Filed: Oct. 3, 1994

[51] Int. Cl.⁶ .................................................. B60R 21/06
[52] U.S. Cl. ............................................ 280/749; 180/274
[58] Field of Search .................................. 280/748, 749, 280/753; 180/274

[56] References Cited

U.S. PATENT DOCUMENTS

| | | | |
|---|---|---|---|
| 2,854,281 | 9/1958 | Cassin | 280/753 |
| 3,133,746 | 5/1964 | Zazzara | 280/753 |
| 3,650,542 | 3/1971 | Shimano et al. | 280/749 |
| 3,692,327 | 9/1972 | Barrick, Sr. et al. | 280/749 |
| 4,569,534 | 2/1986 | Nalbandyan et al. | 180/274 X |
| 5,112,881 | 5/1992 | Kesseru | 280/749 |

FOREIGN PATENT DOCUMENTS

| | | | |
|---|---|---|---|
| 0964471 | 5/1957 | Germany | 280/753 |
| 0049542 | 4/1977 | Japan | 280/749 |

*Primary Examiner*—Christopher P. Ellis
*Attorney, Agent, or Firm*—Birch, Stewart, Kolasch & Birch, LLP

[57] ABSTRACT

A crash net safety device for an automobile, includes a U-shaped bar having a net fixed to the ceiling of the automobile and pivotally connected to both interior sides of the automobile. A trigger is operatively connected to one end of the U-shaped bar and connected to impact points located outside of the automobile, whereby upon vehicle impact, the U-shaped bar with the net comes down and protects passengers in the automobile during the vehicle accident.

7 Claims, 1 Drawing Sheet

CRASH NET SAFETY DEVICE FOR AN AUTOMOBILE

BACKGROUND OF THE INVENTION

1. Field of the Invention

The present invention relates to a crash net safety device for an automobile and more particularly, to an improved device including a U-shaped mounting bar with a net, so that upon vehicle impact, the device automatically comes down for covering human beings in the automobile so as to minimize injury.

2. Description of Related Art

Inflatable air bag structures are being commonly used in passenger vehicles to promote passenger safety in the event of an accident. Such air bag structures include inflation means which, when activated, rapidly form a gas which causes high speed inflation of air bags in front of passengers to absorb impact shock and to thereby minimize injury. Sensor systems are provided to cause activation of the air bag structure immediately upon vehicle impact.

Generally, air bags are folded and mounted in relatively small canister-like housings which are positioned behind the vehicle instrument panel. The housing is slidably mounted in a chute structure which, in turn, is mounted in an opening in the instrument panel in front of the area occupied by the passenger in the front seat of the vehicle. As the air bag is deployed, it passes into the chute and is guided by the chute into the proper area within the vehicle to function in the desired shock absorbing fashion. Recently, several types of air bag devices mounted on a rear side of a front seat of a vehicle have been introduced. However, such air bag mounting devices always create some wasteful spaces in a rear seat area so that it is inconvenient for passengers in the rear seat. Further, the above air bag devices are complicated in structure so that such devices are frequently out of order and do not perform well when operating. Furthermore, sometimes inflation of air bag devices collide with passengers so that the driver becomes temporarily blinded and disoriented, thereby creating a number of problems.

SUMMARY OF THE INVENTION

Accordingly, it is an object of the present invention to provide a crash net safety device for an automobile, which eliminates the above problems encountered with the conventional air bag devices.

Another object of the present invention is to provide a crash net safety device including a U-shaped bar with a net, disposed in the ceiling of the automobile and above the passengers, and a trigger disposed at one end of the U-shaped bar and connected to two pairs of impact points located at both side portions of the front and rear bumpers of the automobile. Upon vehicle impact, the U-shaped bar comes down and covers passengers with the net so as to minimize injury.

Still another object of the present invention is to provide a crash net safety device for an automobile which is simple in structure, compact for portability, inexpensive to manufacture, durable in use, and does not create any wasteful space.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
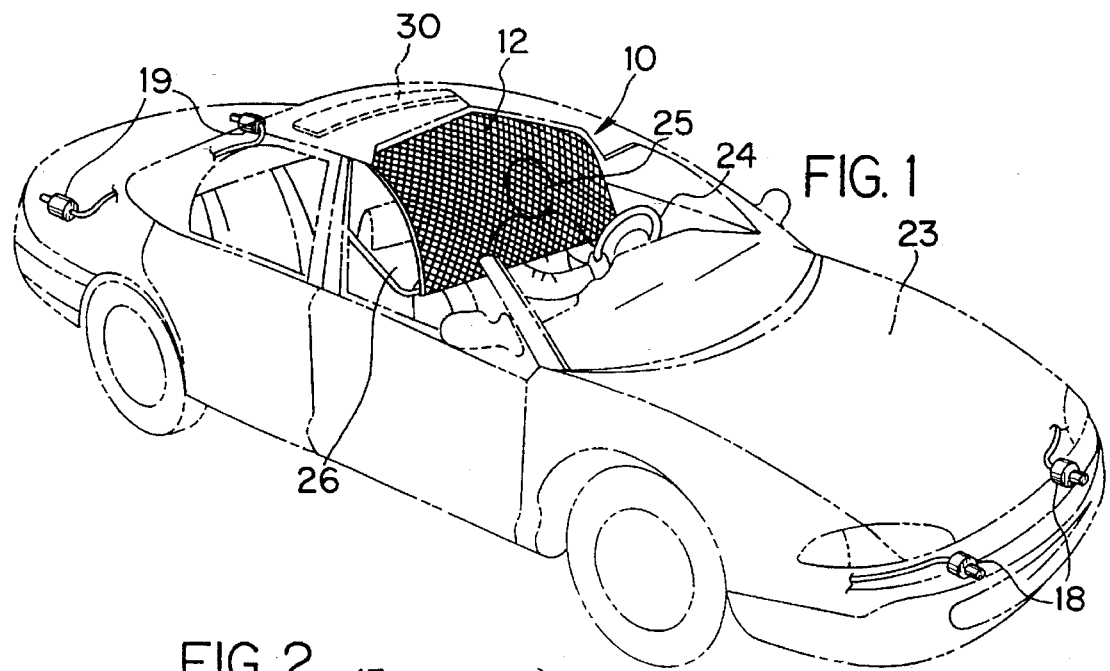
FIG. 1 is a perspective view of a crash net safety device for an automobile according to the present invention.
Figure 2:
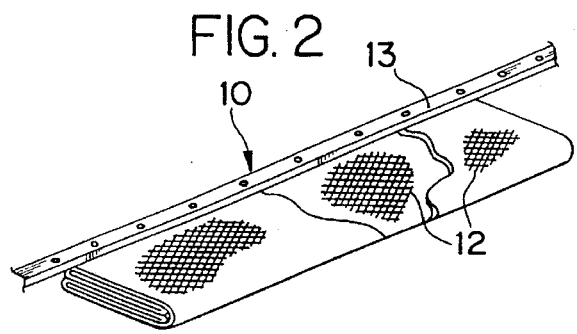
FIG. 2 is a perspective view of the crash net safety device for an automobile stored in the ceiling of the automobile according to the present invention.
Figure 3:
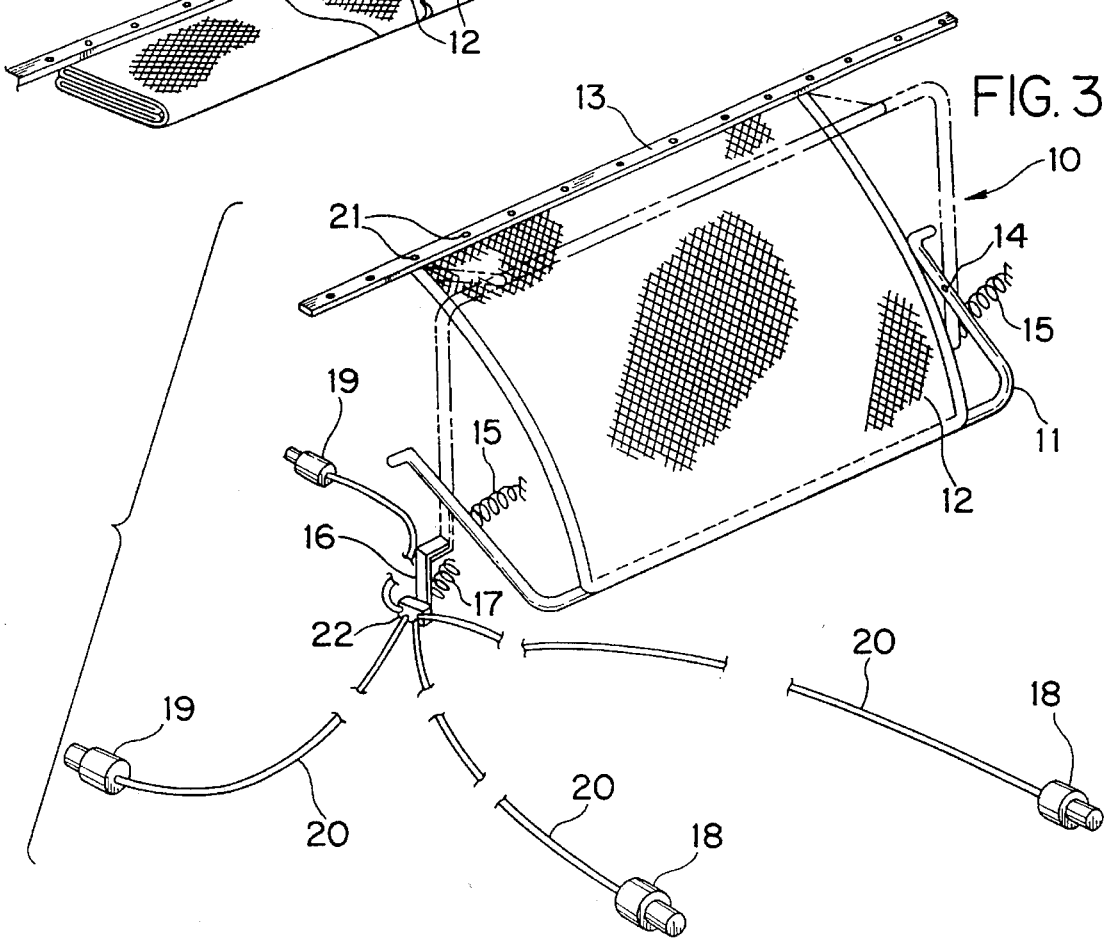
FIG. 3 is a perspective view of the crash net safety device for an automobile in an open position according to the present invention.

Referring now in detail to the drawings for the purpose of illustrating preferred embodiments of the present invention, the crash net safety device 10 for an automobile as shown in FIGS. 1, 2, and 3, comprises a U-shaped bar 11 having a net 12, a horizontal support 13 attached to the ceiling of the automobile, for supporting one end of the net 12. The net 12 has a rectangular configuration.

The U-shaped bar 11 having two ends is pivotally mounted to both sides of the interior of the automobile by pivotal pins 14 at ends thereof (FIG. 3). A pair of first springs 15 are provided for tightly pressing against both ends thereof (FIG. 3). The horizontal support 13 is mounted to the ceiling of the automobile by a plurality of bolts 21. The U-shaped bar 11 is preferably made of rubber and has a significant weight. One end of the U-shaped bar 11 is provided with an L-shaped member.

A trigger 16 is operatively connected to one end of the U-shaped bar 11 and has a connection point 22 which is connected by steel wire 20 to the plurality of impact points 18 and 19. The trigger 16 has an L-shaped configuration for mating with the L-shaped member of the U-shaped bar 11. The plurality of impact points 18 and 19 define a pair of front impact points 18 and a pair of rear impact points 19 disposed on the most front area of the front portion 23 and rear portion of the automobile, respectively (FIG. 1). The impact points 18 and 19 can also be located at both sides of the automobile. The trigger 16 is supported by a second spring 17. The wires 20 are made of steel.

The crash net safety device 10 according to the present invention operates as follows. When the automobile including the crash net safety device has an impact, the impact points 18 or 19 receive the impact, so that the wire 20 pushes the connection point 22 of the trigger 16. Therefore, the trigger 16 separates from the one end of the U-shaped bar 11 and immediately, the bar 11 comes down as shown in FIGS. 1 and 3.

The net 12 covers the driver and any other passenger in the automobile. That is, the crash net safety device is partitioned between the human beings 25 in the front seat 26 and the steering wheel 24 of the automobile (FIG. 1). Accordingly, the present crash net safety device can minimize injury. Also, the opened crash net safety device 10 can be reused by returning the U-shaped bar 11 in the original position. That is, the one end of the bar 11 is assembled with the trigger 16 again.

As shown in FIG. 1, the crash net safety device 30 is optionally located at the rear ceiling of the automobile for protecting passengers in the rear seat of the automobile. In addition, the U-shaped bar 11 could be pivotally attached to the vehicle ceiling or at a location adjacent to the windshield.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A crash net safety device attached to a ceiling of an automobile, comprising:

a net having a first end portion and a second end portion, said first end portion being fixed to said ceiling;

a U-shaped bar having a substantially horizontal portion made of a substantially resilient material, and a pair of arm portions extending therefrom, said arm portions being pivotally mounted to two interior sides of said automobile by a pair of pivotal pins and provided with a first pair of springs for pressing against the U-shaped bar, and said second end portion of said net being operatively attached to said substantially horizontal portion of said U-shaped bar;

a trigger operatively connected to said U-shaped bar at one end thereof and provided with a second spring for retaining the trigger; and a plurality of impact points located on the outside of the automobile, said impact points connected to said trigger through wires, whereby upon vehicle impact, the trigger is separated from the one end of the U-shaped bar and the net safety device immediately comes down and covers passengers in the automobile for minimizing injury;

wherein one end of said U-shaped bar for mating with the trigger has an L-shaped member, and said trigger has an L-shaped configuration for mating with the L-shaped member of the U-shaped bar so as to smoothly separate from each other.

2. The crash net safety device of claim 1, wherein said net has a rectangular configuration for effectively covering the passengers in the automobile.

3. The crash net safety device of claim 1, wherein said wires are made of steel.

4. The crash net safety device of claim 1, wherein said ceiling is provided with a horizontal support for tightly and easily fixing the net to the ceiling.

5. A crash net safety device attached to a ceiling of an automobile, comprising:

a net having a first end portion and a second end portion, said first end portion being fixed to said ceiling;

a U-shaped bar having a substantially horizontal portion made of a substantially resilient material, and a pair of arm portions extending therefrom, said arm portions being pivotally mounted to two interior sides of said automobile by a pair of pivotal pins and provided with a first pair of springs for pressing against the U-shaped bar, and said second end portion of said net being operatively attached to said substantially horizontal portion of said U-shaped bar; and a trigger operatively connected to said U-shaped bar at one end thereof and provided with a second spring for retaining the trigger;

wherein upon vehicle impact, the trigger is separated from the one end of the U-shaped bar and the net safety device immediately comes down and covers passengers in the automobile for minimizing injury;

wherein one end of said U-shaped bar for mating with the trigger has an L-shaped member, and said trigger has an L-shaped configuration for mating with the L-shaped member of the U-shaped bar so as to smoothly separate from each other.

6. The crash net safety device of claim 5, wherein said net has a rectangular configuration for effectively covering the passengers in the automobile.

7. The crash net safety device of claim 5, wherein said ceiling is provided with a horizontal support for tightly and easily fixing the net to the ceiling.

* * * * *